Oct. 31, 1950
G. W. CRISE
2,528,038
VARIABLE COLOR DENSITY ANTIGLARE
VISOR FOR MOTOR VEHICLES
Filed July 17, 1946
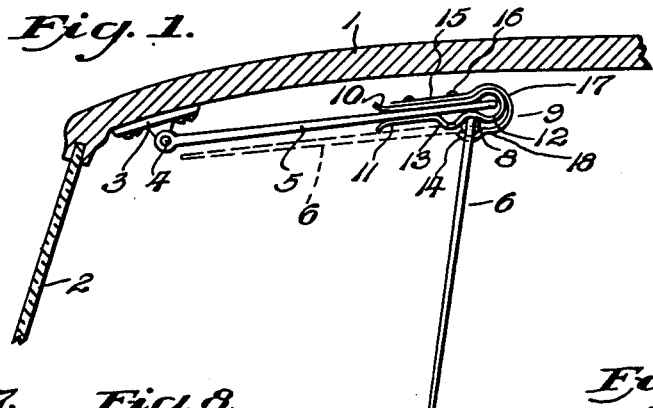
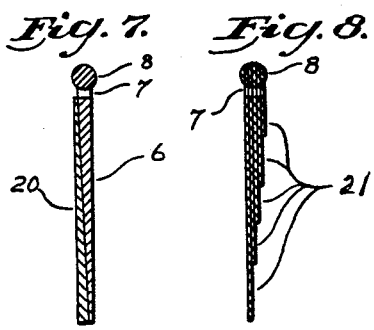
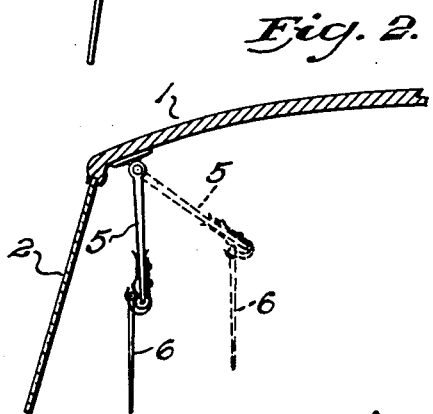
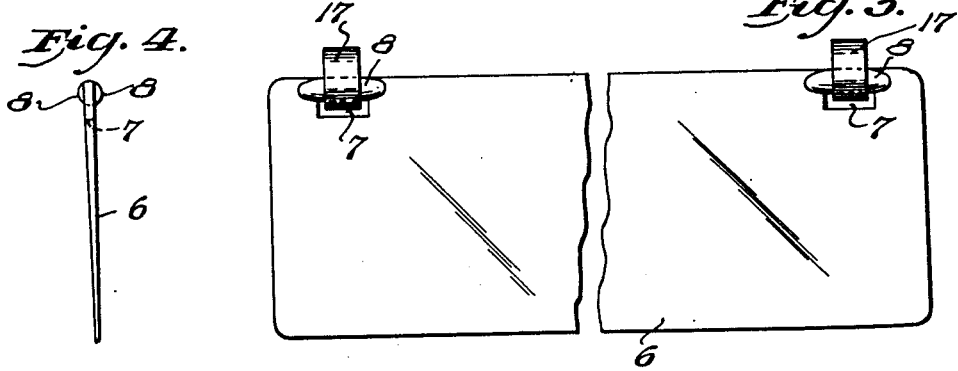
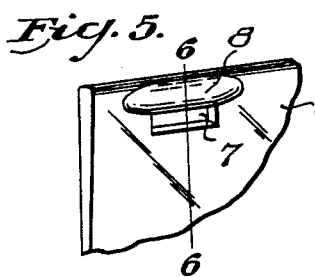
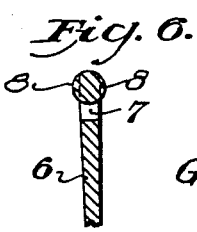
Inventor
George W. Crise
By W. S. McDowell
Attorney Patented Oct. 31, 1950

2,528,038

SEARCH ROOM

UNITED STATES PATENT OFFICE 2,528,038

VARIABLE COLOR DENSITY ANTIGLARE VISOR FOR MOTOR VEHICLES

George W. Crise, Columbus, Ohio.

Application July 17, 1946, Serial No. 684,300

2 Claims. (Cl. 88—108)

The object of my invention is to provide an improvement in eye protection for motorists in the form of a visor of variable transparency, translucency or opaqueness.

It is well known that excessive light, shining in the face of a driver of an automobile, causes discomfort and impaired vision. It is also obvious that, during the day time, the greatest source of this interfering light emanates from the sky above the normal field of the motorist's view, including the road and the landscape in general. For this reason, solid or opaque visors are provided as standard equipment on most motor vehicles, these visors being so mounted that they may be swung downwardly to protect the eyes of the driver. Such visors, however, have the objection of completely eliminating all fields of view above their lower edges, and, therefore, can not be used in obtaining full protection because of the necessity for the motorist to look upwardly at elevated traffic signals and also other elevated road hazards.

Tinted transparent visors have been used to improve these difficulties, but it has been found that a visor with enough light-absorbing power to give adequate protection against strong sunlight is too dense to provide sufficient transparency for safe driving under most conditions.

To solve these problems, the present invention provides a visor whose effective shading qualities can be varied to suit the occasion, and, more specifically, a semi-transparent visor providing maximum shading from the sky and reduced shading from the lower arcs of vision, where light is weaker and the objects to be seen are more important.

To this end, the present invention provides a tinted visor which is comparatively thick at the top and gradually tapering to a thin section at its lower edge, this construction, when fabricated of tinted plastic or glass of uniform color content, providing the variable transparency needed.

In its preferred form, the visor comprising the present invention, is molded of a plastic material and, in addition to its wedge-shape in transverse cross section, is provided with novel molded hinge pins of relatively large diameter, the latter providing strength and effective frictional support for swinging and retaining the visor in any desired angle of operation.

Another feature of my invention is found in the attachment of the wedge-shaped tinted visor to a standard opaque motor car visor. In this regard, I provide a double spring clip which is formed to constitute both an anchoring means to hold the hinges to the regular car visor, and also a tensioning member to provide firm but relatively free swinging movement of the tinted visor for maintaining it in any desired angular position with respect to the regular opaque visor with which it is attached.

For a further understanding of the invention, reference is to be had to the following description and the accompanying drawings, wherein:

Fig. 1 is a vertical sectional view taken through the roof and wind shield of a motor car and disclosing the tinted visor comprising the present invention in an applied position on the standard opaque visor of the motor car, the opaque visor being shown in an elevated position with the tinted visor shown in full lines in a substantially vertical position and in dotted lines in a folded out-of-the-way position;

Fig. 2 is a similar view disclosing in full lines the opaque visor in its lowered position and in dotted lines in an angular position with respect to the horizontal and vertical;

Fig. 3 is a front elevational view of the color tinted visor comprising the present invention;

Fig. 4 is an edge elevational view of the visor;

Fig. 5 is a fragmentary detail perspective view of one of the hinge slots of my improved visor;

Fig. 6 is a vertical sectional view on the plane indicated by the line 6—6 of Fig. 5;

Fig. 7 is a sectional view disclosing a modified form of my improved visor;

Fig. 8 is a similar view of a further modified form.

Referring more particularly to the drawings, the numeral 1 designates the roof construction of the body of a motor vehicle, and the numeral 2 the usual wind shield. Secured to the lower surface of the roof construction near the upper edge of the wind shield, is a bracket 3 to which is pivoted as at 4 one edge of a standard opaque wind shield visor 5.

The present invention consists in providing such a visor with a novel transparent color-tinted auxiliary visor 6, which is adapted for attachment to the lower or free edge of the main opaque visor and to be movably adjustable with respect thereto. The visor 6 comprises a panel of glass or plastic composition having a uniform coloration so that it is transparent or translucent, and while vision is permitted therethrough, it nevertheless offers protection to the eyes of a motorist from sun or headlight glare.

A particular feature of the visor 6 is that it possesses a tapering or wedge-shaped form, the same tapering from its upper attached to its lower free edge, being comparatively thick at its points of attachment to the free edge of the visor 5 and thin at its lower or free edge, as shown particularly in Fig. 4. Although the visor 5 possesses a uniform coloration, the fact that it tapers, enables the motorist to readily see through the lower region thereof and with more difficulty through its upper regions. Thus, the motorist by raising or lowering his head, or by adjusting the operating positions of the visors 5 and 6, may obtain the best positions in the matter of securing protection from distressing light rays and at the same time in providing a sufficiently clear view of the road conditions ahead to obtain required driving safety.

In mounting the auxiliary visor 6 on the main opaque visor 5, the thickened upper region of the visor 6 is formed with a plurality of slots 7, and, as shown more particularly in Fig. 6, the visor 6 above these slots is formed to provide rounded or cylindrical regions 8 of increased cross-sectional thickness as compared with the adjacent body portions thereof. Engaged with each of these slots are double spring clips of the type shown at 9. Each of these clips comprises an inner spring member formed to include resilient legs 10 and 11 which are united by a bow 12. The legs 10 and 11 are maintained in close frictional contact with the adjoining surfaces of the main visor 5 in order to be securely positioned thereon but capable of being detached when desired.

The leg 11 of the inner spring member is formed with double corrugations indicated at 13 and 14 which grip the rounded upper regions of the portions 8 of the auxiliary visor. In association with the inner spring member, each of the clips 9 provides an outer spring member, the latter having a longer leg 15, which is secured, as at 16, to the leg 10 of the inner spring member. The outer spring member also includes a bowed portion 17 which surrounds the portion 12 of the inner spring member, the bowed portion 17 terminating in a relatively short leg 18 which in turn terminates in an arcuate lip 19, disposed in resilient frictional contact with the lower portions of the rounded cylindrical regions 8.

By this spring clip construction, the auxiliary visor may be readily attached to and held upon the free edge of the standard opaque visor and yet readily removed therefrom when desired. Also, the spring clips serve to securely yet adjustably support the auxiliary tinted visor in its various operative positions on the free edge of the main visor, permitting the visor 6 to assume any of the operative positions illustrated in Figs. 1 and 2 or various other positions therebetween.

It will be noted that by selecting the proper position of the auxiliary visor on the various light conditions presented to the operator of a motor vehicle, it is readily possible for the operator to raise or lower his head to obtain an instant change in the effective translucency or opaqueness of the visor. Also, the visors may assume the different positions indicated in the drawings in obtaining optimum driving conditions for securing a clear view of the preceding roadway under conditions of varying incoming light intensities. The device has the advantage of being simple to construct and apply and provides for comfort and safety in motor vehicle operation.

It will be understood that my invention is subject to certain variation or modification without departing necessarily from its fundamental features of construction. For example, in Fig. 7, a modified form thereof has been set forth wherein a second body of a clear wedge-shaped plastic, indicated at 20, is cemented to or molded against the tinted body 6, whereby to give the visor uniform thickness and eliminate the small amount of prismatic distortion, which may be present as a result of the wedge-shaped formation of the visor 6.

Other variations will be apparent to those skilled in the art.

In Fig. 8, a further modified form of the invention has been disclosed in which a translucent visor is of laminated construction, consisting of a number of sheets of a tinted transparent or translucent material, the sheets being of different width to provide varying degrees of translucency, substantially after the manner of the constructions previously described.

I claim:

1. An anti-glare visor attachment for motor vehicles comprising a rectangular transparent and colored panel having transversely disposed areas of diminishing cross-sectional thickness from one longitudinal edge to the other thereof and formed a distance inwardly of its thicker longitudinal edge with a plurality of openings extending through said panel, the thicker longitudinal edge of said panel adjacent to said openings being rounded and providing substantially cylindrical hinge bosses on said panel adjacent to said openings for complemental engagement with a supporting hinge attachment for said panel.

2. In an anti-glare visor attachment for motor vehicles, a rectangular uniformly color-tinted transparent panel having a diminished transverse cross-sectional thickness from one longitudinal edge thereof to the other and formed a distance inwardly of its thicker longitudinal edge with a plurality of longitudinally spaced hinge-receiving openings, the thicker longitudinal edge portion of said panel adjacent said openings being further thickened in cross-section and rounded to provide a plurality of substantially cylindrical hinge bosses adjacent said openings for complemental engagement with a supporting hinge device for said panel.

GEORGE W. CRISE.

REFERENCES CITED

The following references are of record in the file of this patent:

UNITED STATES PATENTS

| Number | Name | Date |
|---|---|---|
| 400,140 | Stockly | Mar. 26, 1889 |
| 977,420 | Merwin | Nov. 29, 1910 |
| 1,987,259 | Koehler | Jan. 8, 1935 |
| 1,990,143 | Snow | Feb. 5, 1935 |
| 2,096,142 | Stover | Oct. 19, 1937 |
| 2,220,429 | Soderberg | Nov. 5, 1940 |
| 2,231,641 | Schwab | Feb. 11, 1941 |
| 2,239,158 | McCloud | Apr. 22, 1941 |

FOREIGN PATENTS

| Number | Country | Date |
|---|---|---|
| 370,656 | Great Britain | Apr. 14, 1932 |